(12) United States Patent
Nousiainen et al.

(10) Patent No.: US 9,247,425 B2
(45) Date of Patent: Jan. 26, 2016

(54) SECURITY CODE(S) OF APPARATUS HAVING AT LEAST ONE SIM

(71) Applicant: UROS OY, Oulu (FI)

(72) Inventors: Marko Nousiainen, Oulu (FI); Ilkka Rahikainen, Oulu (FI); Tommi Uhari, Oulu (FI); Jari A. Kokkonen, Oulu (FI)

(73) Assignee: UROS TECHNOLOGY S.A.R.L., Ettelbruck (LU)

( * ) Notice: Subject to any disclaimer, the term of this patent is extended or adjusted under 35 U.S.C. 154(b) by 147 days.

(21) Appl. No.: 13/886,496

(22) Filed: May 3, 2013

(65) Prior Publication Data

US 2013/0303123 A1    Nov. 14, 2013

(30) Foreign Application Priority Data

May 14, 2012  (EP) ..................................... 12167831

(51) Int. Cl.
| | |
|---|---|
| *H04M 1/66* | (2006.01) |
| *H04W 12/06* | (2009.01) |
| *H04L 29/06* | (2006.01) |
| *H04W 4/00* | (2009.01) |

(Continued)

(52) U.S. Cl.
CPC .............. *H04W 12/06* (2013.01); *H04L 63/083* (2013.01); *H04L 63/0853* (2013.01); *H04W 4/003* (2013.01); *H04M 1/673* (2013.01); *H04M 1/675* (2013.01); *H04M 1/72527* (2013.01)

(58) Field of Classification Search
CPC ....... H04Q 7/32; H04W 12/06; H04M 1/0202
USPC .............. 455/410, 423, 558, 432.1, 411, 413, 455/417, 408, 418, 550.1, 419; 726/9, 7; 370/338
See application file for complete search history.

(56) References Cited

U.S. PATENT DOCUMENTS

| | | | |
|---|---|---|---|
| 8,787,947 B2 * | 7/2014 | Backholm et al. ............ 455/466 |
| 2008/0020755 A1 * | 1/2008 | Liu et al. .................... 455/432.1 |
| 2010/0210304 A1 * | 8/2010 | Huslak .......................... 455/558 |

FOREIGN PATENT DOCUMENTS

| | | |
|---|---|---|
| EP | 1 098 543 | 5/2001 |
| EP | 2 518 983 A2 | 10/2012 |

(Continued)

OTHER PUBLICATIONS

Pashalidis et al., "A Taxonomy of Single Sign-On Systems," *Information Security and Privacy*, 2003, pp. 249-264, vol. 2727.

(Continued)

*Primary Examiner* — Kiet Doan
(74) *Attorney, Agent, or Firm* — Oliff PLC

(57) ABSTRACT

An apparatus includes one or more processors, one or more memories. The apparatus is portable and it includes or is coupled with at least one subscriber identification module capable of storing one or more security codes which are used in a security code check for controlling usability of the at least one subscriber identification module with the apparatus. The apparatus obtains a request from the at least one subscriber identification module for at least one security code. The apparatus controls providing an automatic response to the request with at least one security code available to the apparatus for enabling or disabling the use of the at least one subscriber identification module. The apparatus transmits a request for a security code to a server wirelessly. The server transmits wirelessly a code stored in the database to the at least one apparatus as a response to the request.

19 Claims, 12 Drawing Sheets

(51) Int. Cl.
  *H04M 1/673* (2006.01)
  *H04M 1/675* (2006.01)
  *H04M 1/725* (2006.01)

(56) References Cited

FOREIGN PATENT DOCUMENTS

| WO | WO 97/43866 | * | 4/1997 | ............... H04Q 7/32 |
| WO | WO 2006/128295 A1 | | 12/2006 | |
| WO | WO 2007/105000 A1 | | 9/2007 | |

OTHER PUBLICATIONS

Partial European Search Report issued in European Patent Application No. 12167831.2 dated Oct. 17, 2012.
Extended European Search Report issued in European Patent Application No. 12167831.2 dated Jan. 4, 2013.

* cited by examiner

SECURITY CODE(S) OF APPARATUS HAVING AT LEAST ONE SIM

FIELD

The invention relates to security code(s) of apparatus having at least one SIM.

BACKGROUND

Security codes such as a PIN (Personal Identification Number) and PUC (PIN Unlock Code) which may also be called a PUK (PIN Unlock Key) control the usability of a SIM (Subscriber Identity Module) of a mobile phone. The security codes (PUK and pre-set PIN) are delivered to a user in conjunction of a purchase of a subscriber connection. The PIN is a rather short code having usually only a few numbers (four for example). Every time the mobile phone is switched on, the mobile phone requires the user to input the PIN. After inputting the pre-set PIN, the user may freely change the PIN. If an incorrect PIN is typed more than a predetermined times (usually three) in response to the inquiry, a proper use of the mobile phone is blocked by locking the SIM and/or the mobile phone. The locked state can be unlocked by entering the PUC which is typically a much longer code than the PIN. The PUC cannot be changed by the user. If an incorrect PUC is typed more than a predetermined times (such as five), the use of the mobile phone is permanently blocked.

First mobile phones had one subscriber identity module (SIM) card. Since then the number of SIM cards has increased. A present mobile phone may have dual or triple SIM cards. Although a number of SIMs could bring many advantages, dealing with a plurality of SIMs and their security codes isn't simple. Also it may be difficult to remember even one security code. Additionally, to change a PIN may be challenging. Hence, if a mobile phone is lost or stolen, the unauthorized use of the mobile phone which depends on the security codes, may be too easy. Hence, there is a need for better solutions.

BRIEF DESCRIPTION

According to an aspect of the present invention, there is provided a apparatus as specified in claim 1.

According to another aspect of the invention, there is provided an server specified in claim 11.

According to another aspect of the invention, there is provided a method specified in claim 14.

According to another aspect of the invention, there is provided a method specified in claim 15.

The apparatus, server and methods in the presented claims are responses to the need for an easy and reliable use of security codes of one or more subscriber identity modules in a portable device having a compact, reliable and user friendly form.

LIST OF DRAWINGS

Example embodiments of the present invention are described below, by way of example only, with reference to the accompanying drawings, in which FIG. 1 illustrates a card with at least one SIM chip;

FIG. 6 illustrates an accessory of a mobile terminal having at least one card with at least one SIM in;

Figure 12:
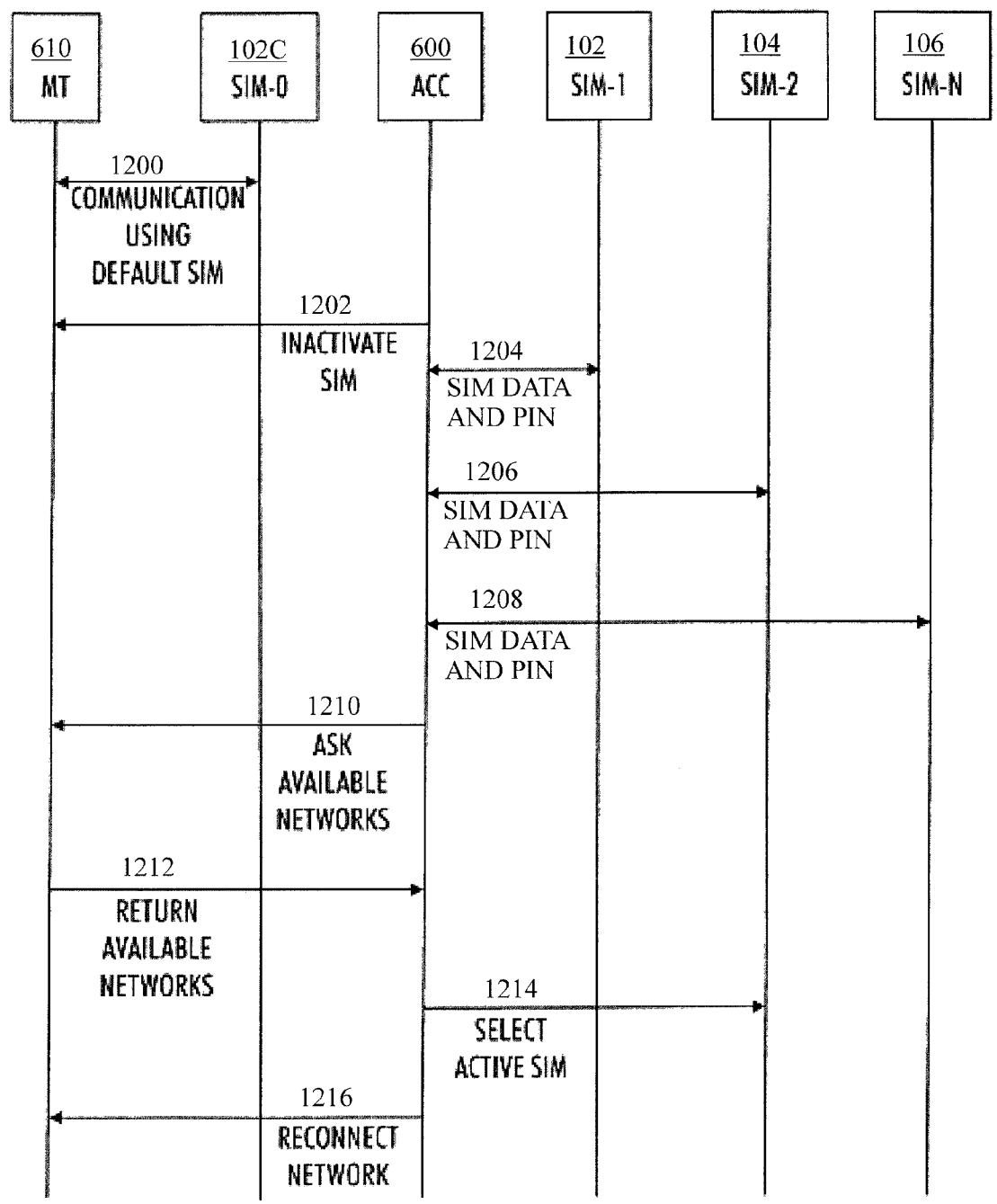
Figure 13:
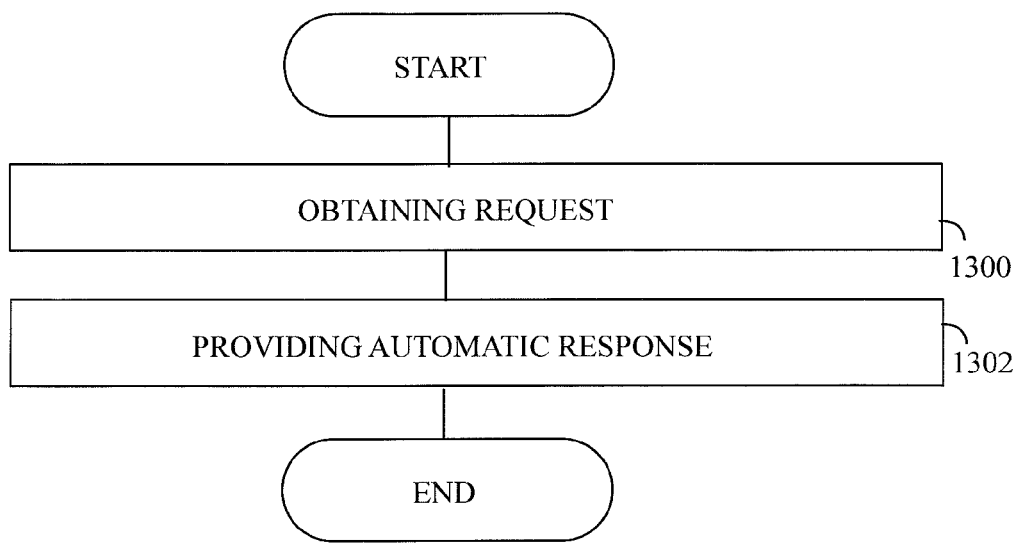

FIG. 12 presents a signalling diagram of a communication procedure between the mobile phone, the accessory and a plurality of subscriber identification modules;

FIG. 13 presents a flow chart of a method of the equipment; and

Figure 14:
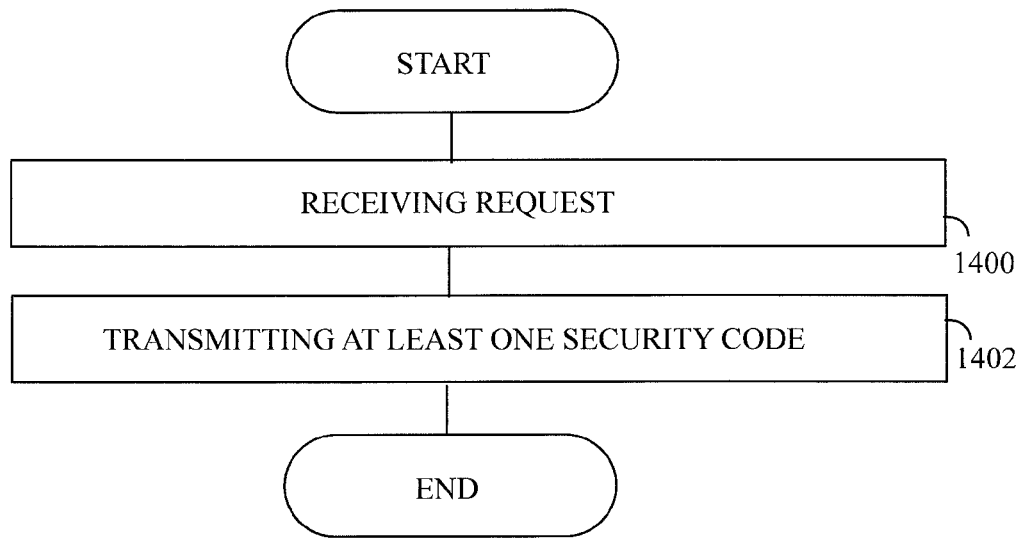

FIG. 14 presents a flow chart of a method of a server.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 11 illustrate various embodiments, they are simplified drawings that only show some structures and functional entities. It is apparent to a person skilled in the art that the described cards and equipment may also comprise other functions and structures. It should be appreciated that details of some functions, structures, and the protocols used for communication are irrelevant to the actual invention. Therefore, they need not be discussed in more detail here.

Figure 1:
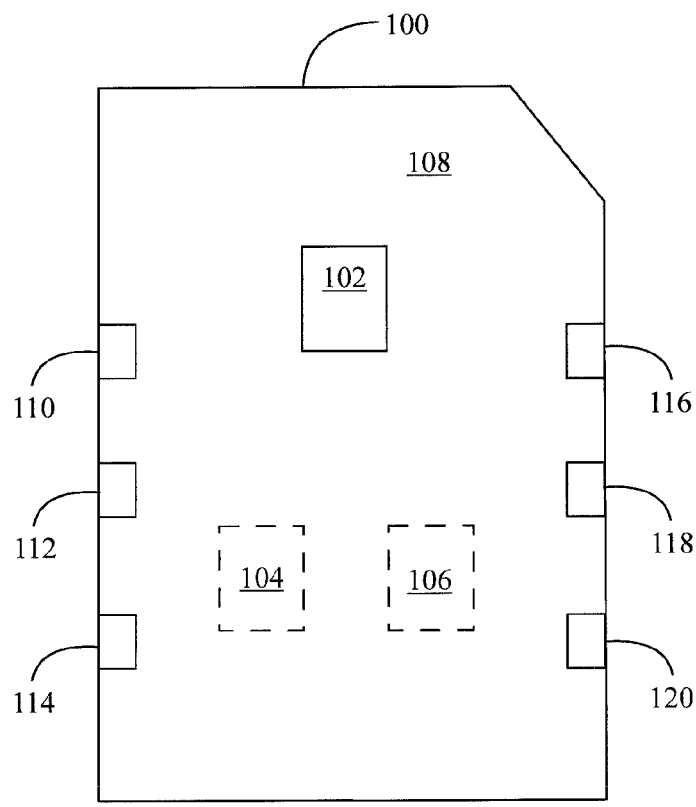

FIG. 1 shows embodiments of a card 100 of one or more subscriber identity module (SIM) chips. In an embodiment, a card 100 may comprise only one subscriber identity module chip 102. However in an embodiment, the card 100 may comprise a plurality of separate subscriber identity module chips 102, 104, 106. The card 100 may also be called as a subscriber identity module card. Although the subscriber identity module chips 102 to 106 may be separate they may be physically integrated in one card 100 which contains them. The carrier structure 108 of the card 100 may be plastic such as polyvinyl chloride, polycarbonate or acrylonitrile butadiene styrene but the carrier 108 is not limited to these materials. In general, the card 100 comprises an operational circuitry which comprises contact pins 110, 112, 114, 116, 118, 120, at least one memory and at least one processor for processing digital data.

The card may have the same size as prior art SIM cards. The size of the card 100 may be 85.60 mm×53.98 mm×0.76 mm, for example which is the size of a credit card. Alternatively, the card 100 may be considerably smaller, 25 mm×15 mm×0.76 mm, for example which is the size of a newer mini-SIM card. Still, the size of the card 100 may be 15 mm×12 mm×0.76 mm, for example which is the size of a micro-SIM card, is even smaller. Naturally, these measures are only examples and hence the size of the card 100 is not limited to these. It is also to be noted than one physical SIM card may include a number of different subscriptions: one SIM card may be a multi-IMSI SIM card having many different subscriber identities in the same card.

In the example of FIG. 1, the operational circuitry of the card 100 comprises electrical circuits of the at least one subscriber identity module chips 102 to 106 and conductors between the contact pins 110 to 120 and the at least one chip 102 to 106. Each of the subscriber module chips 102 to 106 may act as a real/concrete subscriber identity module.

Figure 2:
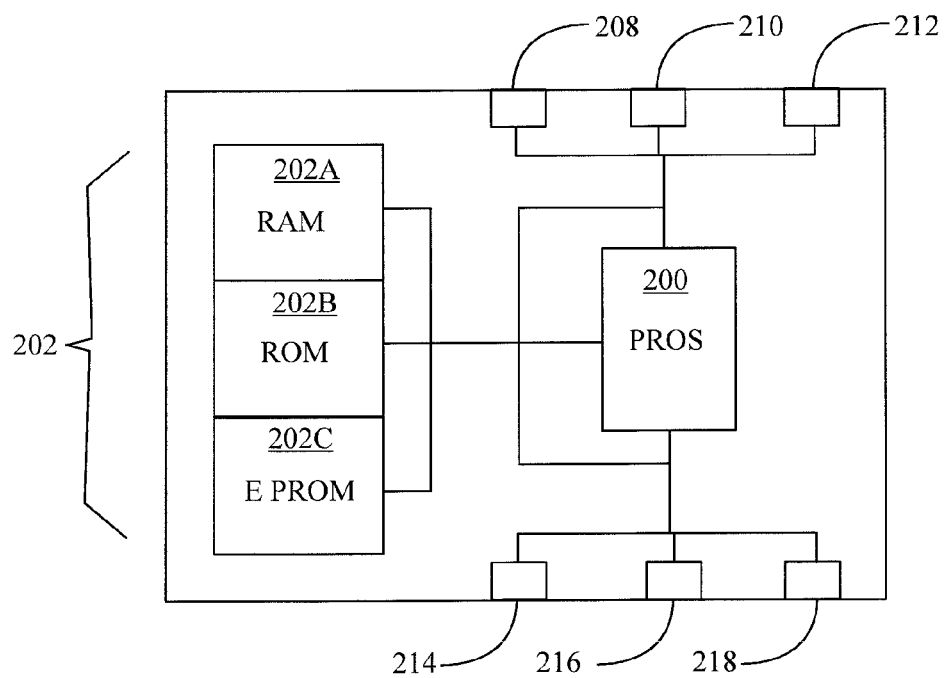
FIG. 2 illustrates an operation circuitry of a card with at least one real or virtual SIM.

FIG. 2 presents a structure of one subscriber identity module chip 102 to 106 (and 102B to 106B, 102C to 106C shown in other Figures). The chip comprises at least one processor 200, at least one memory 202 and electrical contacts 208, 210, 212, 214, 216 and 218. A first memory 202A of the at least one memory 202 may be for storing data such as operator-specific data and/or user-specific data and it may be protected such that it is accessible only by an operator and/or by a service provider. The second memory 202B may be a working memory for a program in use at a particular moment. The third memory 202C may store the computer programs that are used by the at least one processor 200. This memory 202C may also be protected and allowed to be used only by an operator and/or by a service provider. The electric contacts 208 to 218 may connect the at least one processor 200 with the contact pins 110 to 120, and the at least one memory 202 may be coupled with the processor 200. Alternatively, the electric contacts 208 to 218 may connect the at least one memory 202 with the contact pins 110 to 120 directly.

Besides being called subscriber identity module, also other names and abbreviations may be used. USIM (Universal Subscriber Identity Module) is an application for UMTS running on a UICC (Universal Integrated Circuit Card). Each USIM may be a logical entity on the card 100 storing subscriber-identity-module-specific information and other information. The stored information may include user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

When manufacturing the card 100, each of the at least one subscriber identity module chips 102 to 106 may include all the data necessary for a proper operation in its memories. The at least one subscriber identity module chip 102 to 106 may be arranged a in a carrier of the card 100, and electrical coupling between the contact pins 110 to 120 and the at least one subscriber identity module chip 102 to 106 may be formed by the service provider. The service provider is not illustrated in Figures, but the service provider may be an independent supplier of one or more cards 100 to users.

Operators of different wireless communication systems may provide a service provider with the one or more subscriber identity module chips 102 to 106 which are ready to use. When a subscriber identity module chip 102 to 106 is ready to use it contains subscriber-identity-module-specific data. The operator refers to a mobile telephone company which offers wireless communication services to subscribers. Examples of operators may be Vodaphone, NTT DoCoMo, Elisa, AT & T, for example. In conjunction with each registration to a specific radio system of an operator, a user receives a subscriber identity module which includes information on the user and the operator. Each subscriber identity module may also include a unique serial number with which it may be addressed or identified or both addressed and identified.

In an embodiment, at least one operator of at least one wireless communication system may provide the service provider with the at least one subscriber identity module chip 102 to 106 with no data or with insufficient data for use. The subscriber identity module chips 102 to 106 may lack operator-specific data and/or user-specific data, for example. The operators may separately provide the lacking data with the service provider, and the service provider may program the data in the at least one memory 202 of the at least one subscriber identity module chip 102 to 106.

The operators of different wireless communication systems may provide the service provider with the at least one subscriber identity module chip 102 to 106 the use of which is programmably and/or structurally blocked. The operators may separately deliver data such as a key code for removing the programmed block and/or instructions for removing the structural block. In this way, the service provider may open and/or authorize the at least one subscriber identity module chips 102 to 106 in the card 100 for use. This function may be used when a user purchases a subscriber identity module card 100 or a service provider's apparatus including at least one subscriber identity module.

Figure 3:
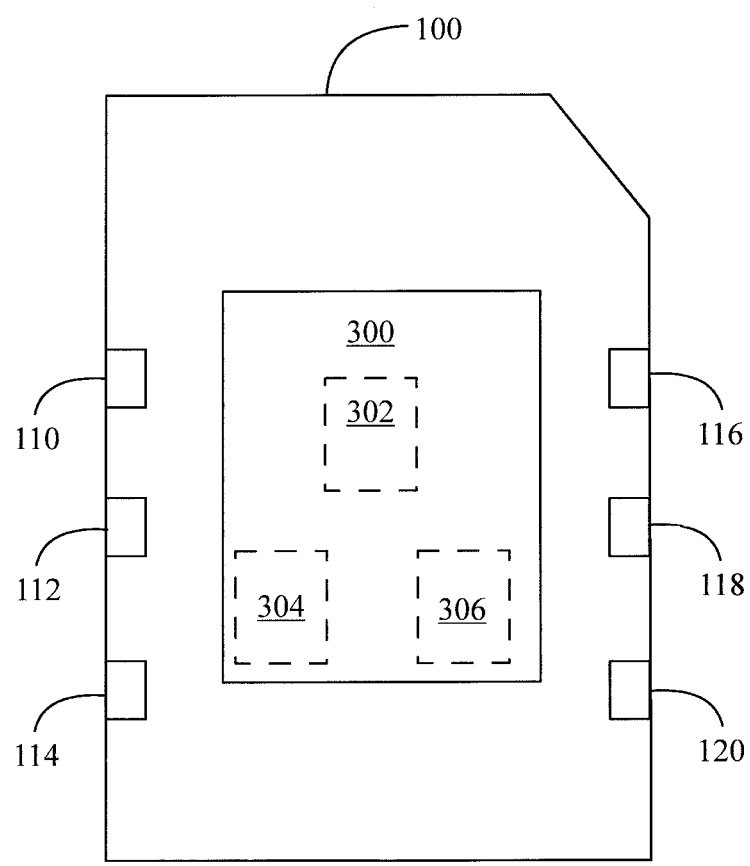
FIG. 3 illustrates a card with an integrated circuit emulating at least one SIM.

FIG. 3 presents an embodiment, where the at least one subscriber identity module chip has been replaced by at least one virtual subscriber identity module. Still what is explained of the at least one subscriber identity module may be applied for the at least one virtual subscriber identity module. Accordingly, the card 100 may comprise an integrated circuit 300 which may emulate at least one subscriber identity module 302, 304, 306 of at least one operator of wireless communication in a virtual form. The emulating operational circuitry may comprise the integrated circuit 300 and contact pins 110 to 120. The integrated circuit 300 may comprise at least one memory and at least one processor to have the required structural and operational complexity associated with the emulation of the at least one subscriber identity module. A part of the at least one memory may be protected and a part of the at least one memory may be non-protected which imitates the state of the memories in the at least one subscriber identity module chip. The at least one memory of the emulating integrated circuit may be divided into different sections, each section being for different operator. Each section may have a different address such that the at least one subscriber identity module may be selected and distinguished from other sections.

Instead of one emulating integrated circuit 300, the card 100 may comprise a plurality of emulating integrated circuits which may emulate the at least one subscriber identity module of the at least one operator of wireless communication in a virtual form. For example, at least two emulating integrated circuits may be used to emulate one subscriber identity module or three emulating integrated circuits may be used to emulate four subscriber identity modules. The operational circuitry may comprise the contact pins 110 to 120 and the at least one emulating integrated circuit which may comprise at least one memory and at least one processor. Also in this embodiment, a part of the at least one memory may be protected and a part of the at least one memory may be non-protected which imitates the state and operation of the memories in the at least one subscriber identity module chip.

The at least one integrated circuit 300 emulating the at least one subscriber identity module may be delivered to the service provider without operator specific data. However, the operators may separately deliver to the service provider data for opening and/or authorizing the at least one subscriber identity module emulated by the at least one integrated circuit in the card 100 for use.

When manufacturing the card 100 having the integrated circuit 300 emulating the at least one subscriber identity module, the service provider may store in the at least one memory of a card 100 subscriber-identity-module-specific data of the at least one subscriber identity module associated with at least one operator of wireless communication for causing the card to act as the at least one subscriber identity module 302 to 306 of at least one operator of wireless communication systems when the card 100 is used. The service provider may also store in the at least one memory of a card 100 instructions of a computer program, that, when executed by the at least one processor, cause the card to act as the at least one subscriber identity module 302 to 306 of at least one operator of wireless communication systems on the basis of the stored subscriber-identity-module-specific data in the at least one memory.

The at least one integrated circuit 300 may comprise an ASIC (Application-Specific Integrated Circuit), PLD (Programmable Logic Device), FPGA (Field-Programmable Gate Array), embedded microcontroller circuit or the like. The at least one integrated circuit 300 may be implemented in a manner similar to that presented in FIG. 2.

The subscriber-identity-module-specific data of the at least one subscriber identity module 102 to 106 and the at least one virtual subscriber identity module 302 to 306 in the at least one integrated circuit 300 may include, for example, a unique serial number (Integrated Circuit Card identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, and other required data. The subscriber data may also include other carrier-specific data such as the short message service centre (SMSC) number, service provider name (SPN), service dialing numbers (SDN), advice-of-charge parameters, and value added service (VAS) applications. Further information may be found in the GSM Technical Specification 11.11.

The subscriber-identity-module-specific data of the at least one subscriber identity module 102 to 106 and the at least one virtual subscriber identity module 302 to 306 in the at least one integrated circuit 300 may also include at least one security code for each subscriber identity module irrespective of whether it is a real chip or a virtual module. A security code may comprise a personal identification number (PIN) or a PIN unlock code (PUC) which act as passwords to enable the use of a subscriber identity module if they passes a security check.

The security check is performed in each of the subscriber identity module 100 by the processor 200. The processor 200 compares a security code which is received from outside of the subscriber identity module 100 with a security code which is pre-saved in the at least one memory 202 of the subscriber identity module 100. If the two codes are found to match, the security code which is received from outside passes the security check and the subscriber identity module 100 is available to use. If the two codes don't match, the security code which is received from outside doesn't pass the security check and the subscriber identity module 100 isn't available to use. The security code may be stored in memories 202A, 202B or 202C. A PIN may be stored in a memory 202C which is an erasable programmable read-only-memory because in prior art the use may freely change his/her PIN. The PUC may also be stored in memory 202C. The security code may also be stored in such part of memory which cannot be changed such as memory 202B. In prior art, the security code received from outside of the subscriber identity module 100 comes from a user interface which is used manually by a user. A subscriber identity module may have more than one personal identification numbers.

The number of the PINs and PUCs may be two for one subscriber identity module. A second PIN functions similarly to the first PIN. If a wrong second PIN is entered more the three times, a second PUC is requested from a user which functions in a similar manner to the first PUC.

The security code check may also be performed as follows. A security code and an algorithm may be stored in the memory 202. When security code to be checked is received by the processor 200, the processor may input the received security code in the algorithm and run the algorithm. The algorithm may output a code as a result which may then be compared with the pre-saved security code stored in the memory 202. If the output code is acceptable i.e. matches with the security code stored in the memory 202, for example, the received security code passes the security check. Otherwise, the received security code doesn't pass the security check.

Figure 4:
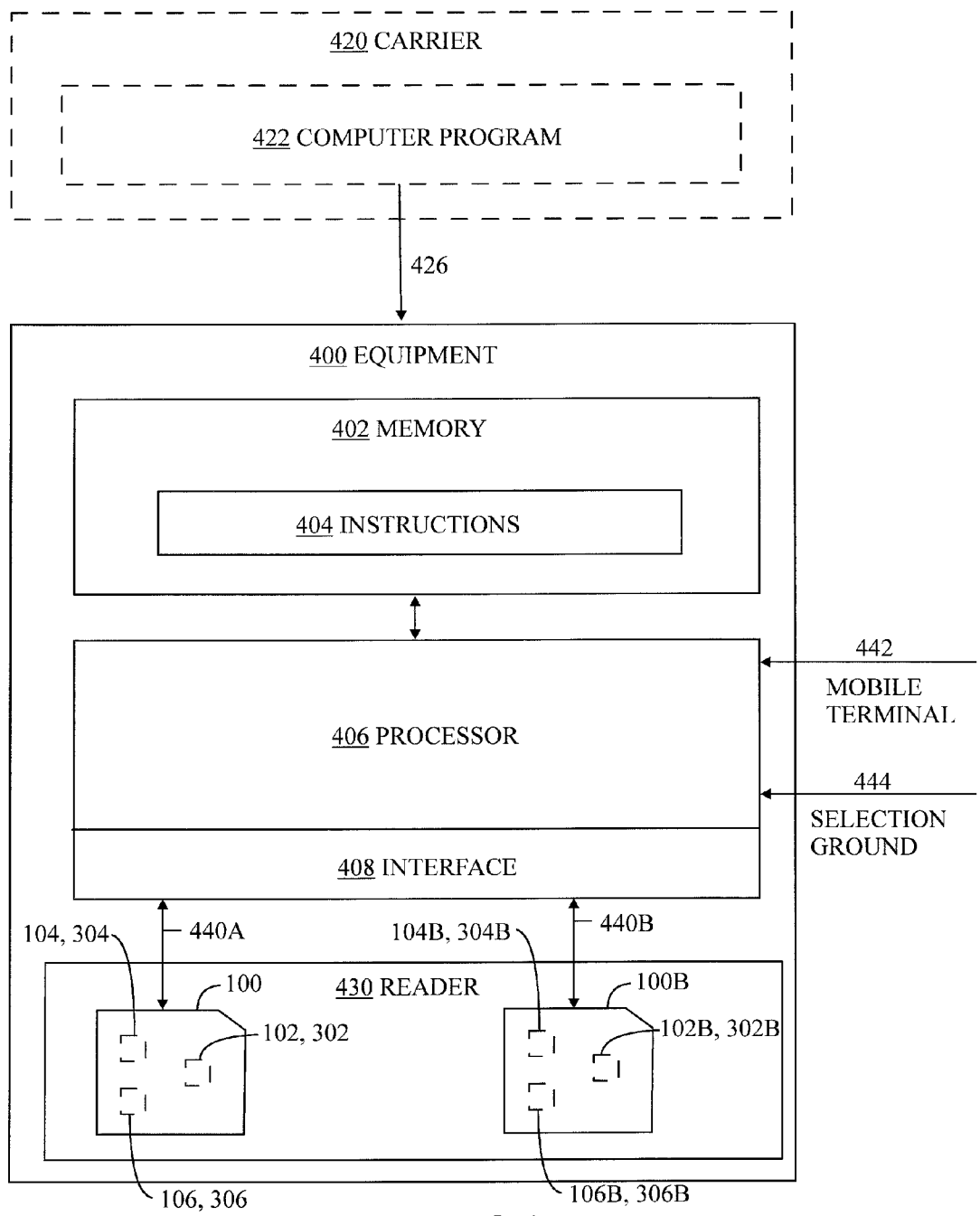
FIG. 4 illustrates equipment having at least one card with at least one SIM.

FIG. 4 presents a block diagram of general equipment 400 which may have the at least one card 100. The equipment 400 may be a mobile terminal 500 like in FIG. 5 or the equipment 400 may comprise two parts like in FIGS. 6 and 8 where at least one of the parts is the mobile terminal 500.

The equipment 400 of FIG. 4 may comprise one or more processors 406, one or more memories 402, and at least one subscriber identification module 102 to 106, 102B to 106B, 302 to 306, 302B to 306B. Instead of comprising the at least one subscriber identification module 102 to 106, 102B to 106B, 302 to 306, 302B to 306B, the equipment 400 may be coupled with the at least one subscriber identification module 102 to 106, 102B to 106B, 302 to 306, 302B to 306B. A processor may be realized as an electric circuit of a digital state machine performing logic operations on the basis of instructions of a computer program.

As already explained, the at least one subscriber identification module 102 to 106, 102B to 106B, 302 to 306, 302B to 306B may be included in at least one card 100, 100B. The at least one subscriber identification module 102 to 106, 102B to 106B, 302 to 306, 302B to 306B are capable of storing one or more security codes which are used in a security code check for controlling usability of the at least one subscriber identification module 102 to 106, 102B to 106B, 302 to 306, 302B to 306B.

The equipment 400 may comprise an interface 408 for exchanging data between the at least one subscriber identity module 102 to 106, 102B to 106B, 302 to 306, 302B to 306B associated with the at least one card 100, 100B and the at least one processor 406. Each of the at least one subscriber identity module 102 to 106, 102B to 106B, 302 to 306, 302B to 306B may be real i.e. a chip or virtual i.e. emulated by the emulating integrated circuit 300 in this case. The at least one subscriber identity module 102 to 106, 102B to 106B, 302 to 306, 302B to 306B, when the cards 100, 100B are coupled with the equipment 400, may be operationally active parts simultaneously or successively. The interface 108 may or may not include a (contact) smart card reader 430 capable of reading the subscriber data through a coupling between the at least one card 100, 100B and the smart card reader 430.

The equipment 400 also comprises one or more memories 402 for storing instructions 404 of a computer program. In an embodiment, the one or more memories 402 store instructions, that, when executed by the one or more processors 406, cause the equipment 400 to obtain a request, which is associated with the security code check, from the at least one subscriber identification module 102 to 106, 102B to 106B, 302 to 306, 302B to 306B for at least one security code. The one or more memories 402 store instructions, that, when executed by the one or more processors 406, cause the equipment 400 to control providing an automatic response to the request with at least one security code available to the equipment for enabling or disabling the use of the at least one subscriber identification module 102 to 106, 102B to 106B, 302 to 306, 302B to 306B. A security code of a subscriber identification module 102 to 106, 102B to 106B, 302 to 306, 302B to 306B which is requested may be a PIN or a PUC, for example.

In an embodiment, the one or more memories 402 may store at least one security code for at least one subscriber identification module pre-saved therein by a service provider of the equipment 400. Then, the instructions stored in the one or more memories 402, when executed by the one or more processors 406, cause the equipment 400 to provide an automatic response to the request with the at least one security code stored in the one or more memories 402. When the at least one security code stored in the one or more memories 402 is correct, which is the usual case when the user has not informed the service provider that the equipment 400 has been stolen, for instance, the at least one security code enables the use of the at least one subscriber identification module 102 to 106, 102B to 106B, 302 to 306, 302B to 306B, since each correct security code passes the security check. Often a PIN of a subscriber identity module may automatically be fed for the security check. However, a PUC may also be fed for the security check in this manner if it is required.

In an embodiment, the equipment 400 comprises or is operably coupled with a wireless transceiver 618 (see FIGS. 5, 6 and 7) which operates on radio frequency signals of a radio system. The instructions stored in the one or more memories 402, when executed by the one or more processors 406, may cause the equipment 400 to wirelessly request for the at least one security code from a server 710 of a service provider, and wirelessly obtain a response from the server 710. Then, the instructions stored in the one or more memories 402, when executed by the one or more processors 406, may cause the equipment 400 to provide an automatic response to the request with at least one security code included in the response received from the server 710. This enables the use of the at least one subscriber identification module 102 to 106, 102B to 106B if the at least one provided security code passes the security check. This operation may be used when the equipment is switched on and the available subscriber identity modules for the equipment have been identified. This operation may also be used after the equipment is switched on and one or more new subscriber identity modules have been set in the equipment. When the one or more new subscriber identity modules identify themselves and request for security codes, the response may be performed accordingly.

In an embodiment, the instructions stored in the one or more memories 402, when executed by the one or more processors 406, may cause the equipment 400 to store each security code obtained from the server 710 in the one or more memories 402. The instructions stored in the one or more memories 402, when executed by the one or more processors 406, may cause the equipment 400 to store each security code obtained from the server 710 in the at least one subscriber identification module 102 to 106, 102B to 106B. The one or more security codes may be stored in the at least one subscriber identification module 102 to 106, 102B to 106B on the basis of the request.

A request from a subscriber identification module can be distinguished from requests from other subscriber identification modules by the unique serial number of each subscriber identification module. Similarly, a security code may be fed to a correct subscriber identification module on the basis of the unique serial number of each subscriber identification module which may have been included in the request. Hence, the instructions stored in the one or more memories 402, when executed by the one or more processors 406, may cause the equipment 400 to receive a unique serial number with the request from each subscriber identification module. Further, the instructions stored in the one or more memories 402, when executed by the one or more processors 406, may cause the equipment 400 to control providing an automatic response to each of the at least one subscriber identity module on the basis of the unique serial number. Hence, each automatic response may be addressed on the basis of the at least one unique serial number such that each part of the automatic response is directed a desired subscriber identity module.

In an embodiment, the instructions stored in the one or more memories 402, when executed by the one or more processors 406, may cause the equipment 400 to obtain, through the wireless transceiver 618, at least one new security code of the at least one subscriber identification module 102 to 106, 102B to 106B, 102C to 106C transmitted by the service provider. And the instructions stored in the one or more memories 402, when executed by the one or more processors 406, may cause the equipment 400 to change the at least one security code by storing at least one new security code in the one or more memories 402. Moreover, the instructions stored in the one or more memories 402, when executed by the one or more processors 406, may cause the equipment 400 to change the at least one security code by storing at least one new security code in the at least one subscriber identification module 102 to 106, 102B to 106B, 102C to 106C. Here also the at least one security code of at least one anchor subscriber identification module 102C to 106C may be changed.

The equipment 400 may comprise or may be operably coupled with a wireless receiver 618 (see FIGS. 5 to 7) which may operate on radio frequency signals of a radio system. The instructions stored in the one or more memories 402, when executed by the one or more processors 406, may cause the equipment 400 to obtain, through the wireless receiver 618, a service provider's lock command associated with at least one subscriber identification module 102 to 106, 102B to 106B. And as a response to the obtained lock command, the instructions stored in the one or more memories 402, when executed by the one or more processors 406, may cause the equipment 400 to: prevent providing with one or more security codes stored in the one or more memories 402 prior to the lock command for limiting the use of the at least one subscriber identification module 102 to 106, 102B to 106B associated with the lock command. Hence, the equipment 400 may automatically stop providing the at least one security code to the at least one subscriber identity module which has been identified in the lock command. The identification of the at least one subscriber identity module may be performed by the at least one unique serial number.

In an embodiment, the equipment 400 may comprise or may be operably coupled with a user interface 616 (see FIGS. 5 to 7), and the instructions stored in the one or more memories 402, when executed by the one or more processors 406, may cause, as a response to the obtained lock command, the equipment 400 to require at least one personal identification number unlock code of at least one subscriber identification module 102 to 106, 102B to 106B associated with the lock command through the user interface 616.

In an embodiment, the lock command may comprise at least one incorrect security code of at least one subscriber identification module 102 to 106, 102B to 106B for causing a failure in the security code check.

In an embodiment, after the lock command and after the service provider has identified the user, the instructions stored in the one or more memories 402, when executed by the one or more processors 406, may cause the equipment 400 to: obtain, through the wireless receiver 618, an unlock command. And the instructions stored in the one or more memories 402, when executed by the one or more processors 406, may cause the equipment 400 to allow providing a response with at least one security code available to the equipment 400 as a response to the unlock command. The use of the at least one subscriber identification module 102 to 106, 102B to 106B may then be enabled if the at least one provided security code passes the security check.

In an embodiment, the one or more memories 402 may store also instructions, that, when executed by the one or more processors, may cause the equipment 400 to obtain data 440A, 440B from the at least one subscriber identity module 102 to 106, 102B to 106B for controlling the use of at least one subscriber identity module 102 to 106, 102B to 106B for wireless communication on the basis of the data 440A, 440B. The data 440A, 440B may include the subscriber-identity-module-specific data, for example. The data uniquely identifies each of the one or more subscriber identity modules which are available, and the data may be used to address each subscriber identity module separately.

In an embodiment with a plurality of subscriber identity modules 102 to 106, 102B to 106B, the instructions 404, when executed by the one or more processors 406, may cause the equipment 400 to obtain data 440A, 440B of the subscriber identity modules 102 to 106, 102B to 106B, obtain selection ground data 444 associated with the subscriber identity modules 102 to 106, 102B to 106B, and select at least one optimal subscriber identity module 102 to 106, 102B to 106B for use by the mobile terminal on the basis of the data 440A, 440B of the subscriber identity modules, and the selection ground data 444 for the subscriber identity modules 102 to 106, 102B to 106B. The data 442 relating to a mobile terminal may also be obtained and it may have effect on the selection.

With this kind of processing, utilization of a wide range of subscriber identity modules becomes possible, and, furthermore, selection of the right subscriber identity module becomes user friendly and automatic (or at least semi-automatic if user interaction is required for the selection or its confirmation). Additionally, the at least one subscriber identity module 102 to 106, 102B to 106B may easily be carried with because the at least one subscriber identity module may be in one card similar to a SIM of prior art.

Depending on the processing power needed, the equipment 400 may comprise several processors 406 such as parallel processors or a multicore processor. When designing the implementation of the processor 406, a person skilled in the art will consider the requirements set for the size and power consumption of the equipment 400 of FIG. 4, the necessary processing capacity, production costs, and production volumes, for example. The processor 406 and the memory 402 may be implemented by an electronic circuitry. In an example embodiment, the processor 406 is Freescale™ i.MX233 applications processor such as MCIMX233CJM4C and the memory 402 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 406 and the memory 402 includes, but is not limited to:
  logic components,
  standard integrated circuits,
  application-specific integrated circuits (ASIC),
  system-on-a-chip (SoC),
  application-specific standard products (ASSP),
  microprocessors,
  digital signal processors,
  special-purpose computer chips, and
  field-programmable gate arrays (FPGA).

Similar techniques may be applied in conjunction with the at least one subscriber identity module chip processor 200, memories 202 and the at least one emulating integrated circuit 300. The instructions 404 may be implemented by software and/or hardware. In an example embodiment, the software may be written by a suitable programming language (such as C, C++, or Java), and the resulting executable instructions 404 may be stored in the memory 402 and run by the processor 406.

In an embodiment, the one or more memories 402 may further store instructions 404, that, when executed by the one or more processors 406, cause the equipment 400 to obtain the data of the at least one subscriber identity module 102 to 106, 102B to 106B by at least one of the following: read the data 440A, 440B from the at least one subscriber identity module 102 to 106, 102B to 106B, receive the data 440A, 440B wirelessly from a service provider, receive the data 440A, 440B from a user interface manipulated by a user of a mobile terminal.

Various criteria may be used alone or in combination for selecting at least one subscriber identity module 102 to 106, 102B to 106B of the cards 100, 100B. A simple selection ground 444 of the at least one subscriber identity module 102 to 106, 102B to 106B could be formulated as follows: "use the cheapest subscriber identity module of the at least one card that provides the required service at the required quality of service in the present location of the mobile terminal by network operator A if available, and if operator A is not available then by any other operator fulfilling the criteria", but this is only an example embodiment, as the selection ground 444 may be much simpler or much more complex.

The one or more memories 402 store instructions 404, that, when executed by the one or more processors 406, cause the equipment 400 to: obtain data 440A, 440B from the at least one subscriber identity module 102 to 106, 102B to 106B and control the use of at least one subscriber identity module 102 to 106, 102B to 106B of at least one operator of wireless communication associated with the at least one card 100, 100B for wireless communication.

In an embodiment comprising a plurality of subscriber identity modules 102 to 106, 102B to 106B, the one or more memories 402 may further store instructions 404, that, when executed by the one or more processors 406, may cause the equipment 400 to use at least one (for example SIM 102) of the subscriber identity modules 102 to 106, 102B to 106B as the default subscriber identity module. The instructions 404 may also use the at least one default subscriber identity module (SIM 102 according to the example) after start-up of the mobile terminal. The at least one default subscriber identity module (i.e. SIM 102 according to the example) may, besides being the at least one starting subscriber identity module, be also the at least one controlling subscriber identity module, and possibly also the at least one back-up subscriber identity module. The mobile terminal may use the at least one default SIM (i.e. SIM 102 according to the example) for communication.

In an example embodiment, the equipment 400 may be a mobile wireless communication terminal, a mobile an accessory of a mobile wireless communication terminal, a combination of a mobile wireless communication terminal and an accessory of the mobile wireless communication terminal, an accessory of a mobile terminal, a combination of a mobile terminal and an accessory of the mobile terminal, or a USB (Universal Serial Bus) modem, or any other suitable mobile terminal capable of employing the at least one subscriber identity module 102 to 106, 102B to 106B, such as a mobile phone, a tablet pc, a portable computer, or a computer.

Figure 5:
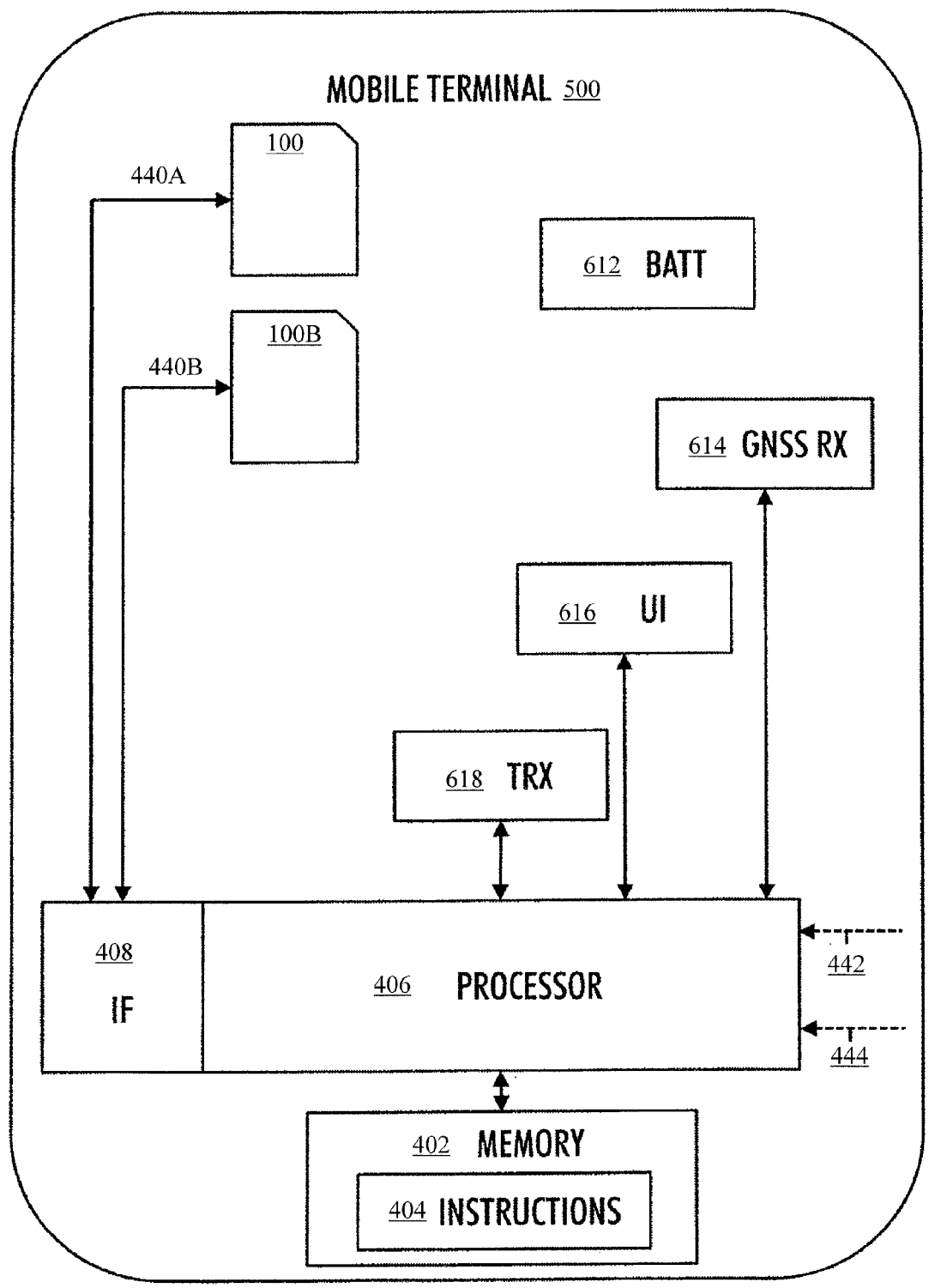
FIG. 5 illustrates a mobile terminal with at least one card.

FIG. 5 illustrates an example embodiment wherein the functionality of the equipment 400 of FIG. 4 is also implemented to the mobile terminal 500. Consequently, the equipment 400 comprises the interface 408 associated with the at least one subscriber identity module 102 to 106, 102B to 106B of the at least one card 100, 100B, the one or more processors 406, and the one or more memories 402 storing the instructions 404. The mobile terminal 400 may also comprise at least some of other parts 612, 614, 616, 618 as shown in FIG. 5, but explained in relation to FIG. 6.

Figure 6:
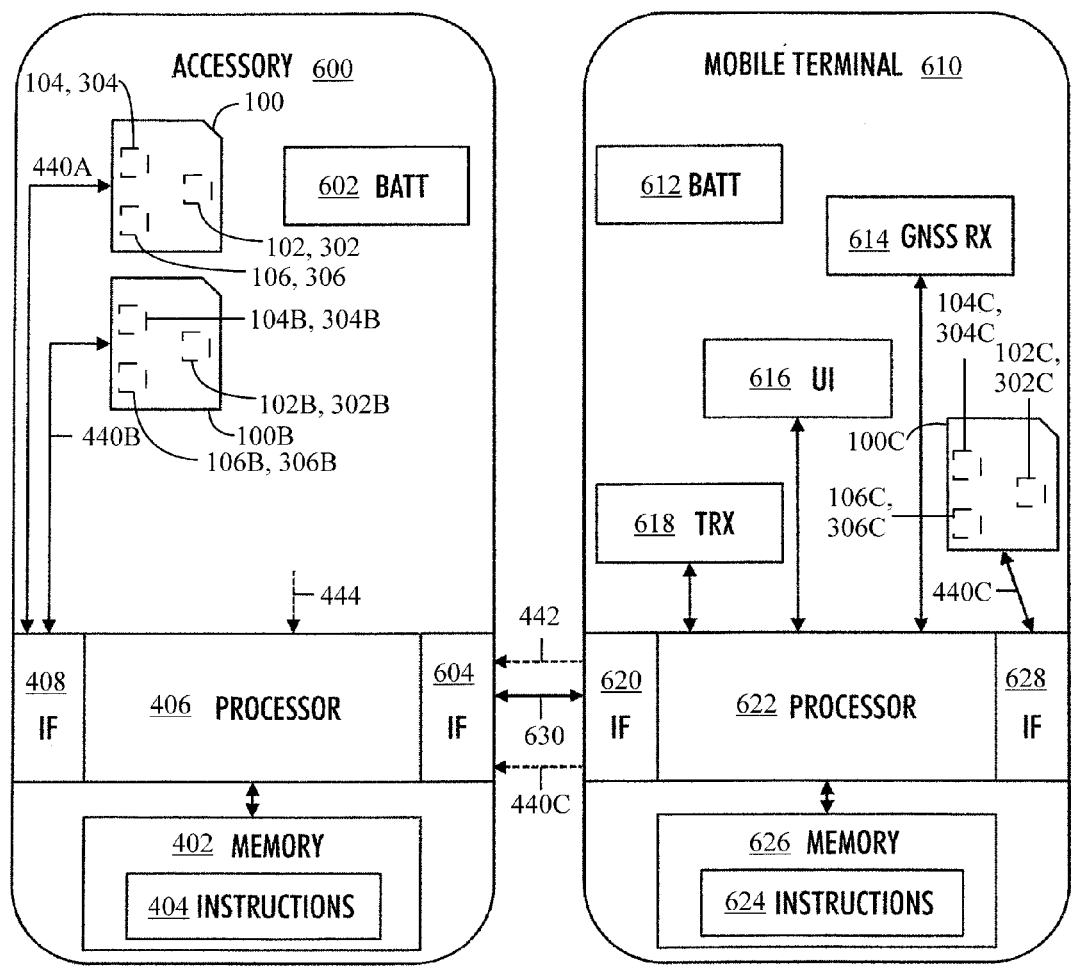

FIG. 6 illustrates an example embodiment wherein the equipment 400 of FIG. 4 functionality is implemented in an accessory 600 of a mobile terminal 610. Consequently, the accessory 600 comprises the at least one the subscriber identity module 102 to 106, 102B to 106B, 302 to 306, 302B to 306B of the at least one card 100, 100B. The accessory 600 may also comprise the at least one processor 406 and at least one memory 402 with the instructions 404. The card 100C may be similar to either of the cards 100 and 100B and have at least one subscriber identity module 102C to 106C, 302C to 306C which may correspond to the at least one subscriber identity module 102 to 106 or 102B to 106B, 302 to 306, 302B to 306B. However, the card 100C may alternatively be a prior art subscriber identity module card of only one SIM. The at least one subscriber identity module 102C to 106C, 302C to 306C may comprise an anchor subscriber identity module 102C (or 302C). In general, there may be more than one anchor subscriber identity module 102C to 106C, 302C to 306C in the card 100C. The at least one anchor subscriber identity module 102C to 106C may be the one which is used when the equipment 400 is switched on. If a different operator is wished for, for example, the subscriber identity module to be used may be changed. The card 100C, like one or more other cards 100, 100B, may be taken out from the mobile terminal 610 and inserted in the accessory 600.

The accessory 600 may or may not comprise a battery 602, depending on the power requirements of the accessory 600 and the possibility to obtain electric energy from an external source such as the mobile terminal 610. The (rechargeable) electrical battery 602 is one or more electrochemical cells that convert stored chemical energy into electrical energy. Instead of battery 602, other suitable means may be used to store and/or provide energy.

The interface 408 associated with the at least one subscriber identity module 102 to 106, 102B to 106B, 302 to 306, 302B to 306B may be within the accessory 600, but also another interface 628 associated with the subscriber identity module 102C to 106C possibly located in the mobile terminal 610 may be needed.

Furthermore, both the mobile terminal 610 and the accessory 600 comprise a wired or wireless communication protocol interface 604, 620 which may be standard or proprietary. The communication protocol interface 604, 620 enables two-way communication 630 between the mobile terminal 610 and the accessory 600. In an example embodiment, the interface 604, 620 may be implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), $I^2C$ (Inter-Integrated Circuit) or SPI (System Packet Interface). The data 440A of the at least one subscriber identity module 102C to 106C, 302C to 306C of the card 100C and the data 442 relating to the mobile terminal 610 may be transferred from the mobile terminal 610 to the accessory 600 through the interfaces 604, 620, 628 and potentially through the at least one processor 622.

The instructions 404, when executed by the one or more processors 406 of the accessory 600, may cause the accessory 600 to: obtain data 440A, 440B from the at least one subscriber identity module 102 to 106, 102B to 106B, 302 to 306, 302B to 306B and control the use of at least one subscriber identity module of at least one subscriber identity module 102 to 106, 102B to 106B of at least one operator of wireless communication associated with the at least one card 100, 100B for wireless communication.

In an embodiment comprising a plurality of subscriber identity modules 102 to 106, 102B to 102B, 102C to 106C, 302 to 306, 302B to 306B, 302C to 306C, the instructions 404, when executed by the one or more processors 406 of the accessory 600, may cause the accessory 600 to obtain the data 440A, 440B, 440C of the subscriber identity modules 102 to 106, 102B to 102B, 102C to 106C, 302 to 306, 302B to 306B, 302C to 306C, obtain selection ground data 444 for the at least one subscriber identity module, and select at least one optimal subscriber identity module 102 to 106, 102B to 102B, 102C to 106C of cards 100, 100B, 100C for use by the mobile terminal 610 on the basis of the data 440A, 440B, 440C of the subscriber identity modules, and the selection ground 444 for the subscriber identity module. The data 442 relating to a mobile terminal 610 may also be obtained and it may have effect on the selection. The data 440A, 440B, 440C may include the subscriber-identity-module-specific data such as ICCID, IMSI or their combination, for instance. The data uniquely identifies each of the one or more subscriber identity modules which are available, and the data may be used to address each subscriber identity module separately.

In an example embodiment, the mobile terminal 610 may be a mobile wireless communications terminal employing a transceiver 618 capable of communicating with a wireless communication system. In an example embodiment, the mobile terminal 610 may be a mobile phone comprising the card 100C comprising a default subscriber identity module 102C, a user interface 616, a battery 612, at least one processor 622 and at least one memory 626 with instructions 624.

The user interface 616 may comprise a display, means for producing sound, a mechanical input means or the like. The display may be a liquid crystal display, an active-matrix of light-emitting diodes or the like, and it may be a touch screen. The means for producing sound may be a loudspeaker or a simpler means for producing beeps or other sound signals. The mechanical input means may comprise a QWERTY keyboard, a keypad and/or a few movable buttons. A parameter, setting or command relating to the described processing of the at least one subscriber identity module 102 to 106, 102B to 102B, 102C to 106C, 302 to 306, 302B to 306B, 302C to 306C may be manipulated with the user interface 616. However, the equipment 400 doesn't accept a PIN from the user interface 616 or the equipment 400 may prevent the use of the user interface 616 for inputting the PIN, since the equipment 400 controls the response to a request to input the PIN. As already explained, the equipment 400 automatically inputs the PIN if its input has not been forbidden by a wireless command coming from the service provider. The equipment 400 may also prevent the use of the user interface 616 for inputting the PUC, since the equipment 400 may also control the response to a request to input the PUC. The equipment 400 may automatically input the PIN if its input has not been forbidden by a wireless command coming from the service provider. Hence in an embodiment, the instructions stored in the one or more memories 402, when executed by the one or more processors 406, may cause the equipment 400 to prevent acceptance of the one or more security codes from the user interface 616 during a request for the one or more security codes.

Furthermore, the mobile terminal 610 may comprise a positioning receiver 614 receiving external location information, which may be utilized to generate location of the mobile terminal 610. The positioning receiver 614 may be a receiver of the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. Besides global navigation satellites, the positioning receiver 614 may also determine its location by utilizing other known positioning techniques. It is well known that by receiving radio signals from several different base stations, a mobile phone may determine its location, for example. The position data may be used as a selection ground data.

In the example embodiment of FIG. 6, the accessory 600 may not comprise a user interface of its own, but the user interaction is performed through the user interface 616 of the mobile terminal 610 as data may be transferred between the accessory 600 and the mobile terminal 610 through the interfaces 604, 620. However, in another example embodiment, the accessory 600 may comprise a user interface as well for outputting and/or inputting data of the described processing of the at least one subscriber identity module 102 to 106, 102B to 102B, 102C to 106C, 302 to 306, 302B to 306B, 302C to 306C of the at least one subscriber identity module card 100, 100B. The user input may be used as a selection ground data.

In the example embodiment of FIG. 6, the equipment 400 of FIG. 4 functionality may be implemented in the accessory 600 such that the instructions 404 are run in the at least one processor 406 of the accessory 600. However, also such an example embodiment is feasible wherein a part of the equipment 400 of FIG. 4 functionality is implemented in the mobile terminal 610 as well such that a part of the instructions 404 are also run in the at least one processor 622 of the mobile terminal 610.

Figure 7:
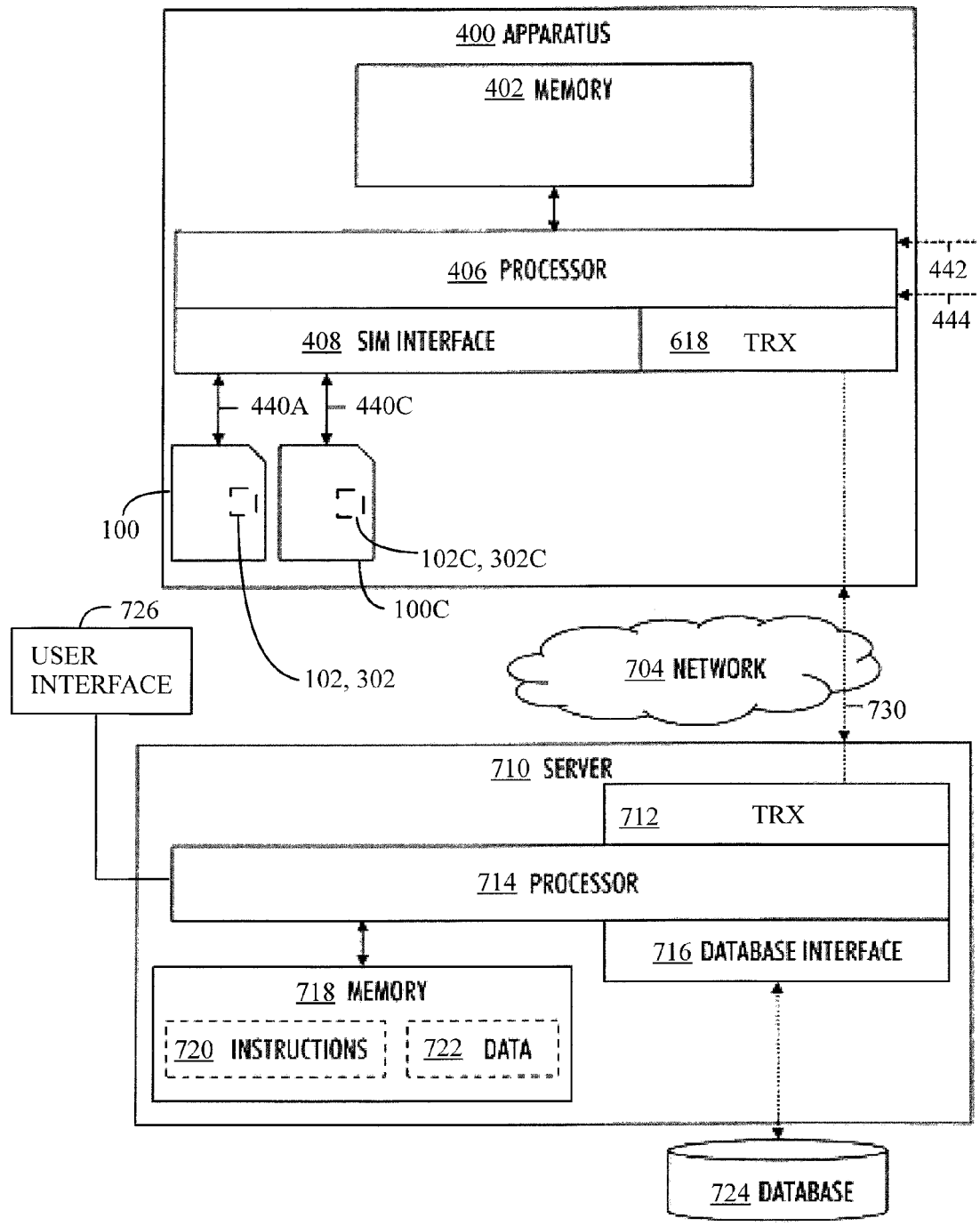
FIG. 7 illustrates a server and its communication with equipment having one or more SIMs over radio interface.

FIG. 7 illustrates example embodiments, wherein an external server 710 participates in communication relating to the at least one subscriber identity module 102, 302, 102C, 302C.

The equipment 400 comprises, as already explained, the SIM interface 408 to the at least one of one subscriber identity module 102, 302, 102C, 302C. Furthermore, the equipment 400 may comprise a radio transceiver 618 of a wireless communication system. In fact, the equipment 400 illustrated in FIG. 7 may be implemented as in any example embodiment described in FIGS. 1 to 6 and 8. These embodiments include a mobile wireless communications terminal, an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, a Universal Serial Bus USB modem. Consequently, the equipment 400 may communicate 730 with the server 710 either through the accessory 600/800, which then includes a suitable transceiver 618, or through the mobile terminal 610, which includes a suitable transceiver 618.

The server 710 may comprise a transceiver 712 capable of communicating 730 with the at least one equipment 400 through a communication network 704. The communication network 704 may comprise a wireless system.

The server 710 may also comprise one or more processors 714, and one or more memories 718 storing instructions 720. In an example embodiment, the server 710 is a computer, such as a single server computer or a cluster of computers, whereby the one or more processors 714 and the one or more memories 718 may be implemented by suitable processors, even in parallel or multicore embodiments, for example. As shown in FIG. 7, data 722 relating to the processing may reside on the one or more memories 718. FIG. 7 also shows that the server 710 may comprise a database interface 716 to a database 724 filled with information relating to the at least one security code of the at least one subscriber identity module 102, 302, 102C, 302C. The database 724 may reside inside or outside the server 710.

An embodiment of the system in FIG. 7 may comprise at least one equipment 400 and a server 710 of the service provider. The server 710 may store each security code of each subscriber identification module 102, 302, 102C, 302C. The server 710 may comprise or may be operably coupled with a wireless transceiver 712 for communicating wirelessly with the at least one equipment 400. In an embodiment, the one or more memories 718 store instructions, that, when executed by the one or more processors 714, cause the server 710 to receive a request, through the wireless transceiver 712, for at least one security code from the at least one apparatus 400. Further, the instructions, that, when executed by the one or more processors 714, cause the server 710 to transmit, through the wireless transceiver 712, at least one security code stored in the database 724 to the at least one apparatus 400 as a response to the received request.

In an embodiment, the one or more memories 718 may store the instructions, when executed by the one or more processors 714, cause the server 710 to obtain an instruction to lock at least one subscriber identification module from the user interface 726, transmit, through the wireless transceiver 712, a service provider's lock command addressed to least one subscriber identification module. Then the equipment 400 may, as a response to the obtained lock command, prevent providing with one or more security codes stored in the one or more memories prior to the lock command for limiting the use of the at least one subscriber identification module associated with the lock command. If the equipment 400 is stolen and the user informs the service provide about the theft, the service provider may start an operation to disable the use of the equipment 400 by locking the at least one SIM 102, 302, 102C, 302C.

In an embodiment, the lock command may comprise at least one incorrect security code for at least one subscriber identification module in order to cause a failure in the security code check.

The wireless communication system may be any standard/non-standard/proprietary radio system that supports the use of the at least one subscriber identity module 102 to 106, 102B to 102B, 102C to 106C, 302 to 306, 302B to 306B, 302C to 306C of the at least one card 100, 100B, 100C. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

Figure 8:
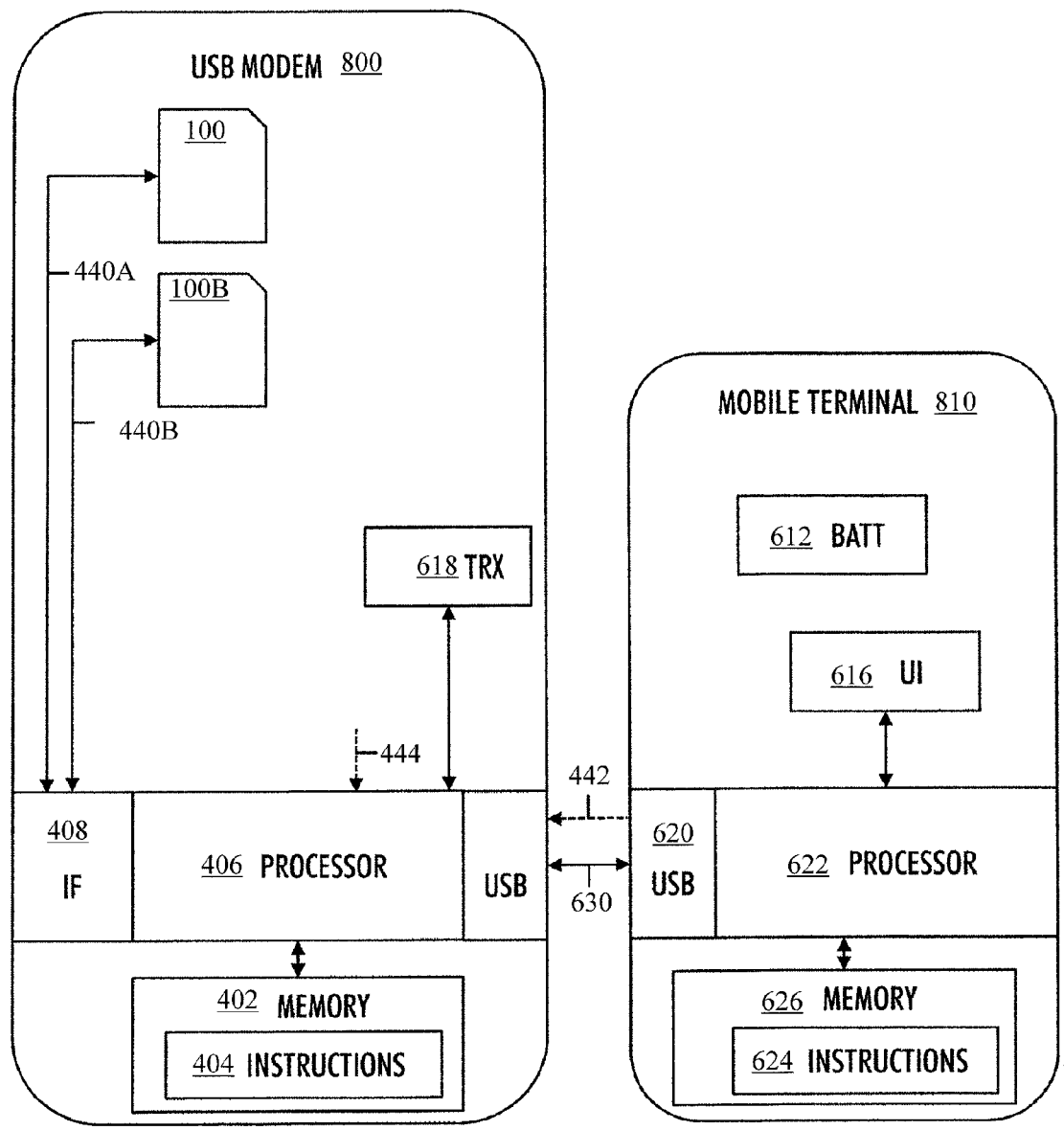
FIG. 8 illustrates a USB modem having at least one card with at least one SIM.

FIG. 8 illustrates a further example embodiment wherein the functionality of the equipment 400 of FIG. 4 is implemented in a USB (Universal Serial Bus) modem 800. In this example, the USB modem 800 which may be used as an accessory of a mobile terminal 810. Consequently, the USB modem 800 comprises the at least one the subscriber identity module 102 to 106, 102B to 106B of the at least one card 100, 100B, the interface 408 associated with the at least one subscriber identity module 102 to 106, 102B to 106B, the at least one processor 406, and at least one memory 402 with the instructions 404.

The USB modem 800 may or may not comprise a battery, depending on the power requirements of the USB modem 800 and the possibility to obtain electric energy from an external source such as a mobile terminal 810.

Furthermore, the USB modem 800 comprises a USB interface 604 capable of being coupled 630 through a USB cable and appropriate connectors to a USB interface 620 of the mobile terminal 810. The data 442 of the mobile terminal 810 may be transferred from the mobile terminal 810 to the USB modem 800 through the interfaces 604, 620.

The instructions 404, when executed by the one or more processors 406 of the USB modem 800, may cause the USB modem 800 obtain data 440A, 440B from the at least one subscriber identity module 102 to 106, 102B to 106B and control the use of the at least one subscriber identity module of at least one operator of wireless communication associated with the at least one card 100, 100B for wireless communication.

In an embodiment comprising a plurality of subscriber identity modules 102 to 106, 102B to 106B, the instructions 404, when executed by the one or more processors 406 of the USB modem 800, may cause the USB modem 800 to obtain the data 440A, 440B of the subscriber identity modules 102 to 106, 102B to 106B, obtain selection ground data 444 for the at least one subscriber identity module, and select at least one optimal subscriber identity module 102 to 106, 102B to 106B for use by the mobile terminal 810 on the basis of the data 440A, 440B of the subscriber identity modules, and the selection ground data 444 for the at least one subscriber identity module. The data 442 relating to a mobile terminal 810 may also be obtained and it may have effect on the selection.

In an example embodiment, the mobile terminal 810 may be a portable computer, a tablet computer, or any other suitable mobile terminal capable of employing the at least one subscriber identity module 102 to 106, 102B to 106B but not necessarily itself including a transceiver capable of communicating with a wireless communication system. Consequently, the mobile terminal 810 may only comprise the battery 612 and the user interface 616 of the other parts of the mobile terminal 610 illustrated in FIG. 6.

In the example embodiment of FIG. 8, the equipment 400 of FIG. 4 functionality may be implemented in the USB modem 800 such that the instructions 404 are run in the at least one processor 406 of the USB modem 800. However, also such an example embodiment is feasible wherein a part of the equipment 400 of FIG. 4 functionality may implemented in the mobile terminal 810 as well such that a part of the instructions 404 are also run in at least one processor 422 of the mobile terminal 810 besides the other instructions 624 stored in at least one memory 626 of the mobile terminal 810.

Figure 9:
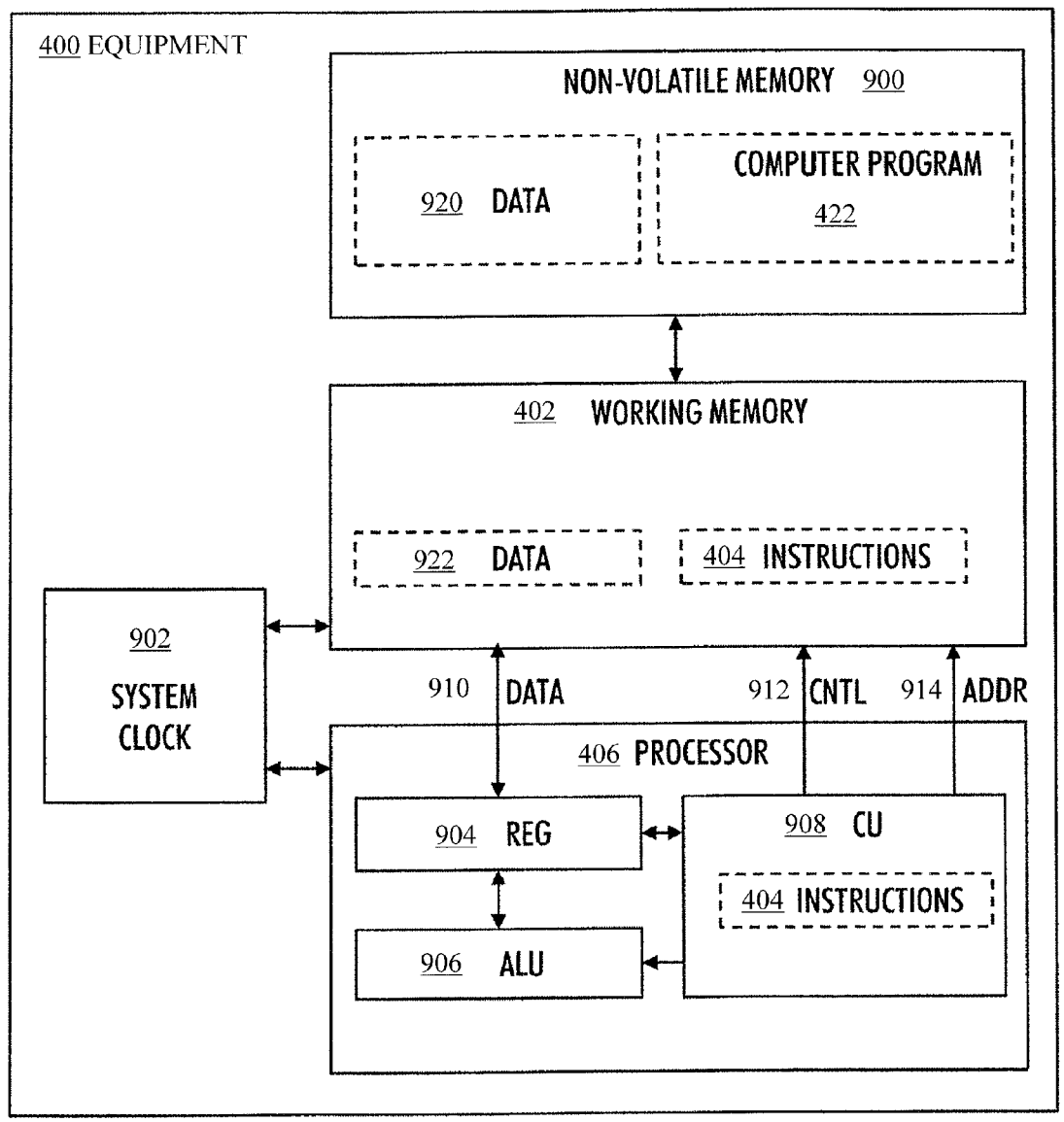
FIG. 9 illustrates the equipment comprising a computer.

FIG. 9 shows an electronic digital computer which is an example of the equipment 400 of FIG. 4. The electronic digital computer, which may comprise, besides the at least one processor 406 and the (working) memory 402, a non-volatile memory 900, and a system clock 902. Naturally, the computer may comprise a number of other peripheral devices, not illustrated here for the sake of clarity.

In an example embodiment, the system clock 902 constantly generates a regular stream of electrical pulses, which cause the various transferring operations within the computer to take place in an orderly manner and with deterministic timing.

In an example embodiment, the at least one processor 406 may be implemented as a microprocessor implementing functions of a central processing unit (CPU) on an integrated circuit. The CPU is a logic state machine executing a computer program 422, which comprises the program instructions 404. The instructions 104 may be coded as a computer program using a programming language, which may be a high-level programming language, such as C, or Java, or a low-level programming language, such as a machine language, or an assembler. The CPU may comprise a set of registers 904, an arithmetic logic unit (ALU) 906, and a control unit (CU) 908. The control unit 908 is controlled by a sequence of instructions 404 transferred to the CPU from the working memory 402. The control unit 908 may contain a number of microinstructions for basic operations. The implementation of the microinstructions may vary, depending on the CPU design. The microprocessor 406 may also have an operating system (a dedicated operating system of an embedded system, or a real-time operating system), which may provide the computer program 422 with system services.

In an example embodiment, there may be three different types of buses between the working memory 402 and the at least one processor 406: a data bus 910, a control bus 912, and an address bus 914. The control unit 908 uses the control bus 912 to set the working memory 402 in two states, one for writing data into the working memory 402, and the other for reading data from the working memory 402. The control unit 908 uses the address bus 914 to send to the working memory 402, address signals for addressing specified portions of the memory in writing and reading states. The data bus 910 is used to transfer data 922, such as data 440A, 440B, 440C, 442, 444 between the working memory 402 to the at least one processor 406, and to transfer the instructions 404 from the working memory 402 to the at least one processor 406. During running of the program 422, the instructions 404 may be transferred via the data bus 910 from the working memory 402 into the control unit 908, wherein usually a portion of the instructions 404 resides and controls the operation of the equipment 400 of FIG. 4.

In an example embodiment, the working memory 402 may be implemented as a random-access memory (RAM), where the information is lost after the power is switched off. The RAM is capable of returning any piece of data in a constant time, regardless of its physical location and whether or not it is related to the previous piece of data. The data may comprise data 440A, 440B, 440C, 442, 444 and any other permanent or temporary data needed during the processing, program instructions etc.

In an example embodiment, the non-volatile memory 900 retains the stored information even when not powered. Examples of non-volatile memory include read-only memory (ROM), flash memory, magnetic computer storage devices such as hard disk drives, and optical discs. As is shown in FIG. 9, the non-volatile memory 900 may store both data 920 and the computer program 422 comprising the instructions 404.

In principle, what is written about the at least one processor 406 and the memories above is true for the at least one processor 200 and the memories 202 of a SIM irrespective of whether they are real or virtual.

An example embodiment of a plurality of subscriber identity modules 102 to 106, 102B to 106B, 102C to 106C provides a computer program 422 comprising the instructions 404 which, when loaded 426 into the equipment 400 of FIG. 4, may cause the equipment 400 of FIG. 4 to obtain data 440A, 440B, 440C of the subscriber identity modules 102 to 106, 102B to 106B, 102C to 106C in cards 100, 100B, 100C, obtain selection ground data 444 associated with the at least one subscriber identity module, and select at least one optimal subscriber identity module 102 to 106, 102B to 106B, 102C to 106C for use by the mobile terminal on the basis of the data 440A, 440B, 440C of the subscriber identity modules, and the selection ground data 444 for the subscriber identity module. The data 442 relating to a mobile terminal may also be obtained and it may have effect on the selection.

In an example embodiment, the computer program 422 may be in source code form, object code form, or in some intermediate form. The computer program 422 may be stored in a carrier 420, which may be any entity or device capable of carrying the program 422 to the equipment 400 of FIG. 4. The carrier 420 may be a computer-readable storage medium. Besides this, the carrier 420 may be implemented as follows, for example: the computer program 422 may be embodied on a record medium, stored in a computer memory, embodied in a read-only memory, and/or embodied on a software distribution medium. The carrier 420 may also be carried on the telecommunications signal. The medium 420 may be a non-transitory computer-readable storage medium.

FIG. 4 illustrates an example embodiment in which the carrier 420 may be coupled 426 with the equipment 400 of FIG. 4, whereupon the program 422 comprising the instructions 404 is transferred into the (working) memory 402, and possibly also into the non-volatile memory 900. The program 422 with its instructions 404 may be loaded from the non-volatile memory 900 into the working memory 402 as needed.

Figure 10:
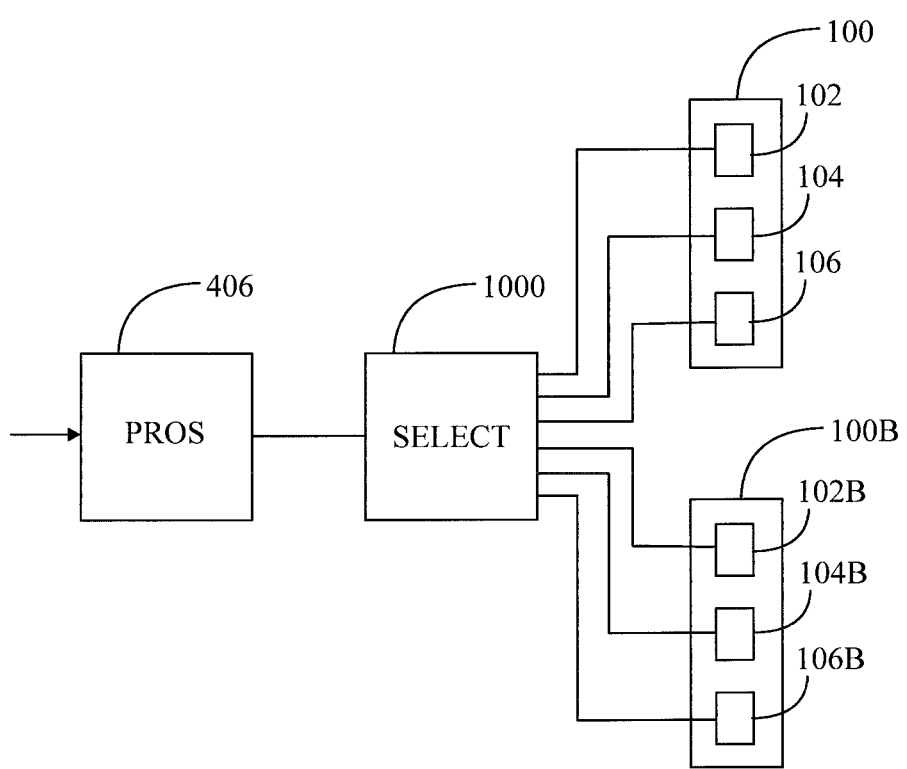
FIG. 10 illustrates selection of at least one SIM from a plurality of SIMs.

FIG. 10 presents a principle of selection of at least one subscriber identity module 102 to 106, 102B to 106B for use on the basis of selection data. The at least one identifier may be formed in the at least one processor 406 on the basis of the data 440A, 440B, 440C of a plurality of the subscriber identity modules, the data 442 relating to the mobile terminal, and the selection ground data 444 for the subscriber identity module. The data 440A, 440B, 440C of the subscriber identity modules and the data 442 relating to the mobile terminal may remain constant but the selection ground data 444 may vary. The computer program 422 comprising the instructions 404 which, when loaded 426 into the equipment 400 of FIG. 4, cause the equipment 400 of FIG. 4 to form the at least one identifier on the basis of the selection ground 444. However, the data 440A, 440B, 440C of the subscriber identity modules and the data 442 relating to the mobile terminal may also have effect on the formation of the at least one identifier. The selector circuit 1000 may, on the basis of the at least one identifier, then enable data transfer between the desired at least one subscriber identity module 102 to 106, 102B to 106B and the at least one processor 106 for wireless communication of the equipment 400. Hence, the at least one subscriber identity module 102 to 106, 102B to 106B may be programmably selected for use. Similarly, the at least one subscriber identity module 102 to 106, 102B to 106B may programmably be deselected when a new selection ground 444 is available or obtained and at least one new identifier is formed. Each subscriber identity module 102 to 106, 102B to 106B may be addressed using an identifier referring to the subscriber identity module 102 to 106, 102B to 106B.

In an embodiment, the selector circuit 1000 may be a part of the equipment 400 outside the at least one card 100, 100B, 100C. In an embodiment, the selector circuit 1000 may be a part of each card 100, 100B, 100C. In an embodiment, the selector circuit 1000 may reside partly in the equipment 400 outside the at least one card 100, 100B, 100C and partly in each card 100, 100B, 100C. The selector circuit 1000 may comprise logic gates which enable communication between the at least one processor 406 and the at least one selected subscriber identity module by opening a proper coupling therebetween irrespective whether the at least one selected subscriber identity module is real or virtual. The selector circuit 1000 may be realized using combinational logic and/or sequential logic.

Figure 11:
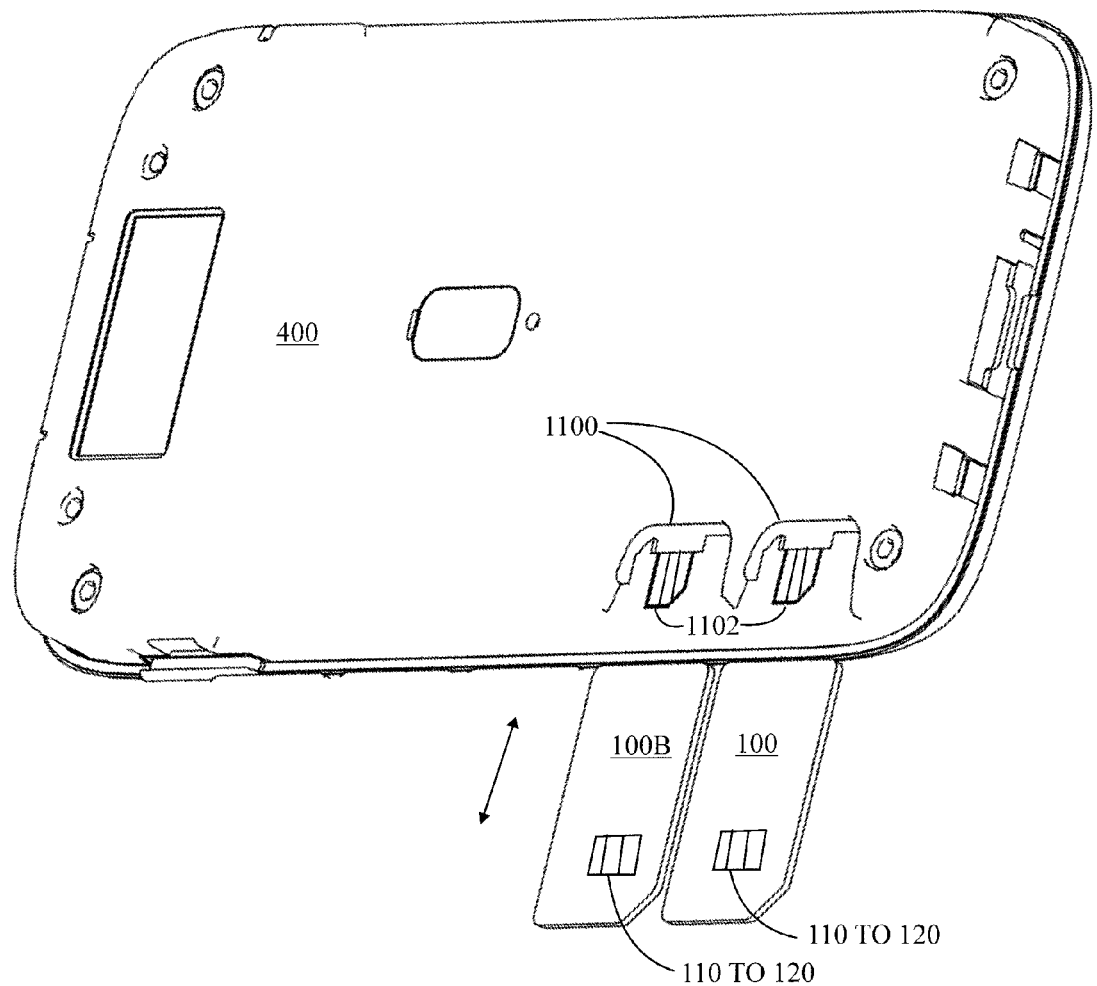
FIG. 11 illustrates a mechanical structure of the equipment.

FIG. 11 presents mechanics of the equipment 400 associated with wireless communication. The equipment 400 may be the mobile terminal 500, 610, 710, 810, the accessory 600, 700 or the USB modem 800. The equipment 400 may also comprise pockets 1100 for the at least one card 100, 100B. The number of pockets may be one or more. The pockets 1100 may be arranged parallel or in some other manner in the equipment 400.

Each pocket 1100 may have an empty space the size and shape of which may closely correspond to those of the card 100, 100B. Each pocket 1100 has electrical contact electrodes 1102 for coupling with contact pads 110 to 120 of the card 100, 100B. The electrical contact electrodes 1102 are in electrical connection with the operational circuitry of the card 100, 100B. The at least one card 100, 100B is removably attachable to the equipment.

The equipment 400 may be made thin and pocked sized and the equipment 400 may thus also be portable like present mobile phones, for example. Here thin means a thickness of less than about 2.5 cm, and often 0.5 cm to 2 cm. Other dimensions of the equipment 400 are defined by the outer structures and they may be about 5 cm to 20 cm×4 cm to 15 cm, for example. The equipment 400 may comprise or may be made of plastic, composite, ceramics or metal, for example.

FIG. 12 illustrates an example of a possible signalling diagram of a communication procedure between the mobile phone, the accessory and a plurality of subscriber identification modules.

In an example embodiment, the one or more memories 402 further store instructions 404, that, when executed by the one or more processors 406, cause the equipment 400 to treat one of the subscriber identity modules 102C as the default subscriber identity module and to use the default subscriber identity module 102C after start-up of the mobile terminal. The default subscriber identity module 102C may, besides being the starting subscriber identity module, be also the controlling subscriber identity module, and possibly also be the back-up subscriber identity module. In FIG. 12, the mobile terminal 610 uses 1200 the default SIM 102C for communication.

The use of the default SIM 102C includes that the SIM 102C requests the equipment 400 for at least one security code. The request for the at least one security code may performed by requesting a PIN from the equipment 400. In the example of FIG. 12 the accessory 600 receives the request and responds to the request automatically by outputting a suitable PIN for the SIM 102C such that the user doesn't need to respond. In an embodiment, the user intervention is blocked. The user doesn't receive the request since it is not mediated to the user interface. Hence, the user may not be allowed to input the PIN or any security code that is requested by any SIM. The SIM which is requesting a PIN may also output data on its unique identification with the request. The data on the identification may be used to determine the suitable PIN to be included in the response from among a plurality of PINs of other SIMs stored in the one or more memories 402 of the equipment 400.

In an example embodiment, the one or more memories 402 further store instructions 404, that, when executed by the one or more processors 406, cause the equipment 400 to detect roaming of the mobile terminal, and to initiate said selection of the at least one optimal subscriber identity module 102 to 106 for use by the mobile terminal. The subscriber identity modules 102B to 106B, 104C and 106C have not been shown for clarity, but they may be included in the selection. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures. If the visited network is in the same country as the home network, this is known as National Roaming. If the visited network is outside the home country, this is known as International (or Global) Roaming. If the visited network operates on a different technical standard than the home network, this is known as Inter-standard roaming. GSM Coverage Maps is a unique resource containing information supplied and approved by the members of the GSM Association. Network, services and roaming information are continually updated to reflect the evolving situation worldwide.

The accessory 600 may inactivate 1202 the mobile terminal 610, and scan 1204, 1206, 1208 SIM data from the at least one more subscriber identity module 102 to 106 that may be located in the accessory 600. The scan 1204, 1206, 1208 refers to data 440A, 440B, 440C which includes identification of the at least one SIM 102 to 106. The identification may refer to subscriber-identity-module-specific data or a separate and unique serial number of a SIM given by the service provider. The scan 1204, 1206, 1208 includes that the at least one SIM 102 to 106 requests the equipment 400 for at least one security code for the at least one SIM 102 to 106. Each request for the at least one security code may performed by requesting a PIN of each SIM from the equipment 400. In the example of FIG. 12 the accessory 600 receives the at least one request and responds to the at least one request automatically by outputting one or more suitable PINs for the at least one SIM 102 to 106 such that the user doesn't need to respond. In an embodiment, the user intervention is blocked. The user doesn't receive the at least one request since the at least one request is not mediated to the user interface. Hence, the user may not input the at least one PIN or any security code that is requested by any SIM. The SIM which is requesting a PIN may also output data on its unique identification with the request. The data on the identification may be used to determine the suitable PIN to be included in the response from among a plurality of PINs of other SIMs stored in the one or more memories 402 of the equipment 400.

Next, the accessory 600 may ask 1210 for available networks from the mobile terminal 610, whereupon the mobile terminal 610 may return 1212 data on the available networks to the accessory 600. The accessory 600 may then select 1214 at least one optimal subscriber identity module 102 to 106 for use by the mobile terminal as the active SIM on the basis of the data 1204, 1206, 1208 relating to the subscriber identity modules 102 to 106, the data 1212 relating to the mobile terminal 610, and the at least one selection ground for the subscriber identity module. In our example, SIM-2 104 may be selected 1214 as the active SIM, whereupon the accessory 600 may instruct 1216 the mobile terminal 610 to reconnect network with the optimal active subscriber identity module 104.

FIG. 13 presents a flow chart of a method of an operation of the equipment 400 which is apparatus of the method. In step 1300, a request, which is associated with the security code check, is obtained in an apparatus for at least one security code from the at least one subscriber identification module. In step 1302, providing an automatic response to the request with the at least one security code available to the apparatus is controlled in the apparatus for enabling or disabling the use of the at least one subscriber identification module.

FIG. 14 presents a flow chart of a method of an operation of the server 710. In step 1400, a request is received for at least one security code from the at least one apparatus through a wireless transceiver. In step 1402, at least one security code stored in a database associated with the server is transmitted through the wireless transceiver to at least one apparatus as a response to the received request.

Wireless communication devices develop rapidly. Therefore, all words and expressions should be interpreted broadly and they are intended to illustrate, not to restrict, the embodiments presented above. It will be obvious to a person skilled in the art that, as technology advances, the inventive concept can be implemented in various ways. The invention and its embodiments are not limited to the examples described above but may vary within the scope of the claims.

The invention claimed is:

1. A portable apparatus for providing an automatic response to a subscriber identification module (SIM) security check request for an authenticating password or numerical code for enabling or disabling use of the portable apparatus, the portable apparatus comprising:
   a processor; and
   a memory; wherein
   the portable apparatus:
   includes and/or is coupled with at least one, and
   is wirelessly coupled with at least one server, the at least one server configured to store one or more authenticating passwords and/or numerical codes,
   the one or more authenticating passwords and/or numerical codes:

configured to be used in a SIM-initiated security check for enabling or disabling usability of the portable apparatus, and the one or more memories are configured to store instructions that, when executed by the one or more processors, cause the portable apparatus to:

when a request for an authenticating password or numerical code is received from the SIM during a SIM-initiated security check:

(i) automatically wirelessly transmit to the server a request for the server to transmit the SIM-requested authenticating password or numerical code associated with the at least one SIM to the portable apparatus, and (ii) when the server determines that the requested password or numerical code is a stored password or numerical code that is stored as indicated as currently available to the portable apparatus from among the stored one or more passwords and/or numerical codes: (a) wirelessly receive, from the server, the indicated as currently available password or numerical code, and (b) automatically respond to the received request for the authenticating password or numerical code from the SIM with the received server-transmitted currently available password or numerical code.

2. The portable apparatus of claim 1, wherein the one or more memories are further configured to store at least one password or numerical code for the at least one SIM pre-saved therein by a service provider; and the stored instructions, when executed by the one or more processors, further cause the portable apparatus to: automatically transmit the response to the request with the at least one pre-saved password or numerical code, for enabling the use of the at least one SIM via the security check.

3. The portable apparatus of claim 1, wherein the portable apparatus further comprises or is operably coupled with a wireless transceiver configured to operate on radio frequency signals of a radio system, and the stored instructions, when executed by the one or more processors, further cause the portable apparatus to wirelessly: automatically perform the wireless transmitting and receiving functions of the portable apparatus via the wireless transceiver.

4. The portable apparatus of claim 3, wherein the request transmitted to the server for the authenticating password or numerical passcode includes a unique serial number associated with the requesting SIM, and the response from the server further includes the unique serial number.

5. The portable apparatus of claim 3, wherein the stored instructions, when executed by the one or more processors, further cause the portable apparatus to: store each security code received from the server in the one or more memories and in the at least one SIM, on the basis of the request.

6. The portable apparatus of claim 3, wherein the stored instructions further cause the portable apparatus to:

receive, through the wireless transceiver, at least one new password or numerical code of the at least one SIM transmitted by the service provider, and change the at least one password or numerical code by storing the at least one new security code in the one or more memories and in the at least one SIM.

7. The portable apparatus of claim 1, wherein:

the portable apparatus further comprises or is operably coupled with a wireless receiver configured to operate on radio frequency signals of a radio system, and the stored instructions, when executed by the one or more processors, cause the portable apparatus to:

receive, through the wireless receiver, a service provider's lock command associated with at least one SIM, and in response to receiving the lock command, prevent transmission of one or more passwords and/or numerical codes associated with the at least one SIM of the service provider's lock command.

8. The portable apparatus of claim 7, wherein the portable apparatus further comprises or is operably coupled with a user interface, and the stored instructions further cause, in response to receiving the service provider's lock command, the portable apparatus to require at least one personal identification number (PIN) unlock code of at least one SIM associated with the lock command through the user interface.

9. The portable apparatus of claim 7, wherein the service provider's lock command comprises at least one incorrect security code of at least one SIM for causing a failure in the security code check.

10. The portable apparatus of claim 7, wherein after the lock command has been received, and the service provider subsequently has identified the user, the stored instructions further cause the portable apparatus to:

receive, through the wireless receiver, an unlock command, and in response to receiving the unlock command, allow transmission of a response with at least one security code indicated as currently available to the portable apparatus, for enabling the use of the at least one SIM, if the at least one provided password or numerical code passes the SIM-initiated security check.

11. The portable apparatus of claim 1, wherein the authenticating password or numerical code is one of: a Personal Identification Number (PIN) and a PIN Unlock Code or Key (PUC or PUK).

12. The portable apparatus of claim 1, wherein the SIM is configured to, during the security check, determine if two passwords or numerical codes match, and, if the codes match, indicate the portable apparatus as currently available.

13. The portable apparatus of claim 1, wherein the SIM is configured to initiate a security check when the portable apparatus is switched on and/or one or more new SIMs have been set in or replaced in the portable apparatus.

14. The portable apparatus of claim 1, wherein the request from the SIM is determined by the server based on a unique serial number of the SIM, and the server transmitted password or numerical code may be fed to the correct SIM on the basis of the unique serial number of the SIM which is included in the request.

15. The method of claim 1, wherein the request from the SIM is determined by the server based on a unique serial number of the SIM, and the server transmitted password or numerical code may be fed to the correct SIM on the basis of the unique serial number of the SIM which is included in the request.

16. A method for providing an automatic response to a SIM-requested security code check request for an authenticating password or numerical code for enabling or disabling use of the portable apparatus, the method comprising:

when a request for an authenticating password or numerical code is received by a portable apparatus from a subscriber identification module (SIM) during a SIM-initiated security check:

(i) automatically wirelessly transmitting by the portable apparatus, to a server, a request for the server to transmit a password or numerical code that is associated with SIM to the portable apparatus; and (ii) when the server determines that the requested password or numerical code is a stored password or numerical code that is stored as indicated as currently available to the portable apparatus from among the stored one or more passwords and/or numerical codes: (a) automatically wirelessly receive, from the server, the indicated as currently available password or numerical code, and (b) automatically respond to the received request for the authenticating password or numerical code from the SIM with the received server-transmitted currently available password or numerical code.

17. The method of claim 16, wherein the authenticating password or numerical code is a Personal Identification Number (PIN) or a PIN Unlock Code or Key (PUC or PUK).

18. The method of claim 16, wherein the SIM is configured to, during the security check, determine if two passwords or numerical codes match, and, if the codes match, indicate the portable apparatus as currently available.

19. The method of claim 16, wherein the SIM is configured to initiate a security check when the portable apparatus is switched on and/or one or more new SIMs have been set in or replaced in the portable apparatus.

* * * * *